United States Patent
Horibata et al.

[11] Patent Number: 5,177,471
[45] Date of Patent: Jan. 5, 1993

[54] LANDSLIDE DETECTING APPARATUS HAVING IMPROVED OPTICAL UNIT

[75] Inventors: Noriko Horibata; Takashi Yoshikawa, both of Kawasaki, Japan

[73] Assignee: Matsushita Electric Industrial Co., Ltd., Osaka, Japan

[21] Appl. No.: 743,248

[22] Filed: Aug. 9, 1991

[30] Foreign Application Priority Data

Aug. 30, 1990 [JP] Japan .................. 2-230365
Oct. 8, 1990 [JP] Japan .................. 2-270851

[51] Int. Cl.⁵ .................................. G08B 21/00
[52] U.S. Cl. .................................. 340/690; 340/540; 250/231.1; 250/231.19; 250/237 R; 73/784
[58] Field of Search .............. 73/784, 84, 862.53, 73/862.82; 340/690, 600, 540; 250/231.10, 231.19, 237 R

[56] References Cited

U.S. PATENT DOCUMENTS

| | | | |
|---|---|---|---|
| 2,000,425 | 5/1935 | Strauss | 250/237 |
| 3,742,233 | 6/1973 | Gorgens | 250/231.19 |
| 3,835,316 | 9/1974 | Checchetti | 250/231.19 |
| 4,493,212 | 1/1985 | Nelson | 250/231.19 |
| 4,539,851 | 9/1985 | Lutenegger | 73/784 |

FOREIGN PATENT DOCUMENTS 642427 5/1977 U.S.S.R. .................. 73/784

Primary Examiner—Jin F. Ng
Assistant Examiner—Christine K. Oda
Attorney, Agent, or Firm—Stevens, Davis, Miller & Mosher

[57] ABSTRACT

A landslide detecting apparatus which is laid under the ground include: a light source; a lens device for converting a beam of light from the light source into a parallel pencil of rays; a condensing lens device; a light detecting device; and a shading mechanism adapted to partly or entirely intercept the pencil of rays in response to external pressures applied thereto. Any change in the earth's crust in a direction to cause a landslide causes the shading mechanism to operate in correspondence with the magnitude of the change so as to partly intercept the parallel pencil of rays and cause a change in the quantity of light detected, making it possible to obtain a quantitative knowledge of the change in the earth's crust. A landslide detecting apparatus may have a plurality of detection units arranged three-dimensionally and radially, each detection unit being equipped with a shading mechanism adapted to operate in correspondence with external pressures applied thereto, a row of light emitting light elements and a row of light receiving elements opposed to each other, the shading mechanism being adapted to intervene between these rows of light emitting and light receiving elements in proportion to external pressures applied thereto.

2 Claims, 6 Drawing Sheets

VIBROMETER-TYPE SENSOR 54

FIG. 1E PRIOR ART

MICROWAVE SENSOR 55

LANDSLIDE DETECTING APPARATUS HAVING IMPROVED OPTICAL UNIT

BACKGROUND OF THE INVENTION

This invention relates to a landslide detecting apparatus for detecting a landslide underneath mountain roads having elevated slope faces, in hilly residence areas, etc.

Figure 1A:
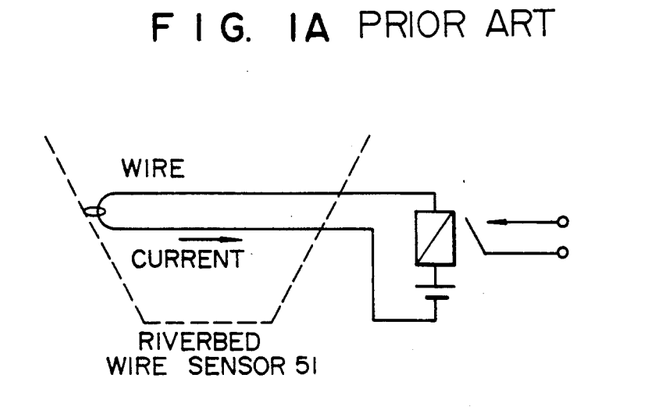
FIGS. 1A through 1E are diagrams showing conventional landslide detecting apparatuses.
Figure 1B:
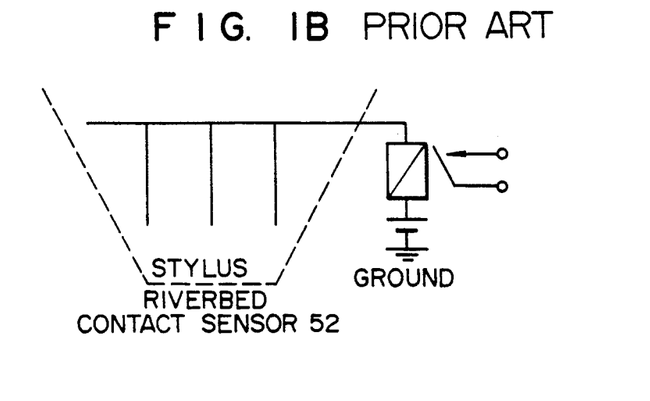
Figure 1C:
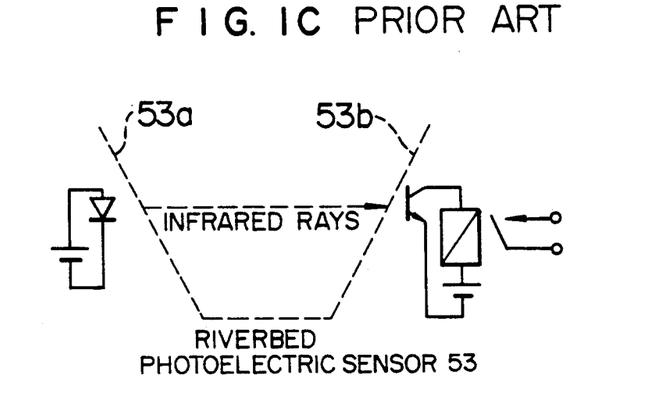
Figure 1D:
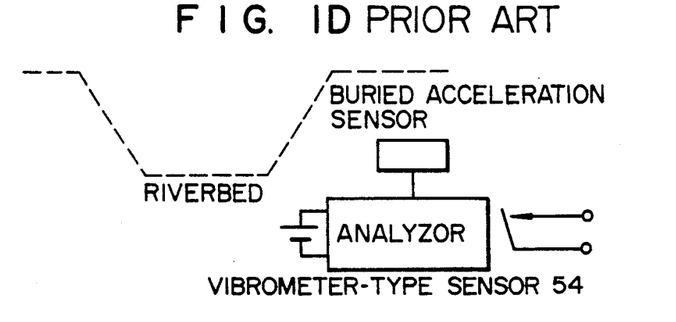
Figure 1E:
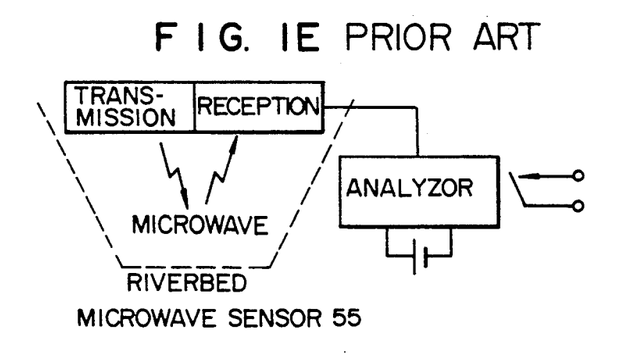

Conventional examples of such a landslide detecting apparatus include: a detection system using a wire sensor 51 as shown in FIG. 1A; a detection system using a contact sensor 52 as shown in FIG. 1B; a detection system using a photoelectric sensor 53 having a light emitting element 53a and a light receiving element 53b as shown in FIG. 1C; a detection system using a vibrometer-type sensor 54 as shown in FIG. 1D; and a detection system using a microwave sensor 55 as shown in FIG. 1E.

These conventional landslide detecting systems have both merits and demerits. For example, in a detection system using a wire sensor 51, a contact sensor 52, a photoelectric sensor 53, or a microwave sensor 55, the sensor is installed on the ground, so that it is under the influence of wind, rain, mist, snow, etc., making it difficult to perform accurate measurement. The vibrometer-type sensor 54 is laid under the ground, so that it is not affected by weather conditions as in the above case. On the other hand, this type of system is rather expensive since it involves a large-scaled apparatus.

SUMMARY OF THE INVENTION

The present invention has been made with a view to solving these problems in the prior art. It is accordingly an object of this invention to provide a landslide detecting apparatus which is capable of detecting great changes as well as subtle ones in the earth's crust without being affected by surrounding weather conditions and which can be made small, lightweight and at low cost.

To achieve the above object, there is provided in accordance with a first invention a landslide detecting apparatus comprising: a light source; a collimator lens for converting a beam of light from this light source into a parallel pencil of rays; a condenser lens for condensing this parallel pencil of rays; a light receiving element arranged at the focal position of this condenser lens; a support means for supporting the light source, the collimator lens, the condenser lens, and the light receiving element in such a manner that they shares a common optical axis; a circular diaphragm arranged in an intermediate position between the collimator lens and the condenser lens and composed of a plurality of diaphragm pieces; movable members arranged in the same number as the diaphragm pieces and constituting a part of an outer shell; connecting members for interlocking the movable members and the diaphragm pieces; and springs for supporting the movable members in such a manner that the diaphragm pieces are arranged in a circle.

In accordance with this first invention, a beam of light emitted from the light source of the detecting apparatus laid under the ground is converted into a parallel pencil of rays by the collimator lens, with this parallel pencil of rays being condensed upon the light receiving element. When a change occurs in the earth's crust in a direction in which a landslide can take place, the movable member placed in that direction is depressed, causing the corresponding diaphragm piece to be pushed inwards through the springs in proportion to the magnitude of the change in the earth's crust. As a result, the parallel pencil of rays is partly intercepted, thereby causing a change in the level of light detected by the light receiving element. By observing this change, a quantitative knowledge of this change in the earth's crust can be obtained.

Further, to achieve the above object, there is provided in accordance with a second invention a landslide detecting apparatus comprising a plurality of detecting units arranged three-dimensionally and radially, each of the detecting units being lodged in a closed casing and equipped with a movable portion adapted to be displaced with respect to the casing by external pressures, the casing further containing a shading plate fixed to the movable portion and a row of light emitting elements and a row of light receiving elements fixed to the casing and opposed to each other, the shading plate being adapted to move between the rows of light emitting and light receiving elements upon relative displacement of the movable portion in proportion to the external pressure applied thereto to intercept the light from that number of light emitting elements which corresponds to the displacement amount of the movable portion.

In the above-described construction according to the second invention, the shading plates fixed to the movable portions of the detecting units move between the rows of light emitting and light receiving elements upon displacement of the movable portions caused by a landslide pressure to effect light interception in correspondence with the displacing amount, thereby causing the light receiving elements to emit a signal corresponding to the landslide pressure. Further, the plurality of detecting units, arranged three-dimensionally and radially, emit signals corresponding to pressures applied in a plurality of directions.

DETAILED DESCRIPTION OF THE PREFERRED EMBODIMENTS

An embodiment of the first invention will now be described with reference to the accompanying drawings.

Figure 2:
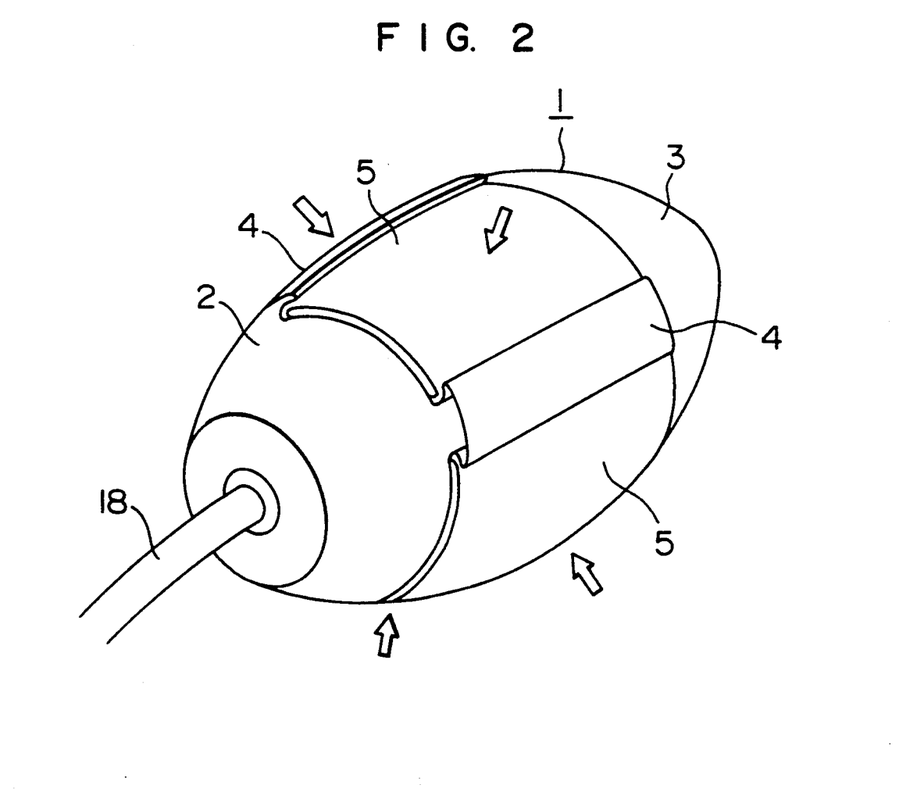
FIG. 2 is an external perspective view of a landslide detecting apparatus in accordance with an embodiment of a first invention.
Figure 3:
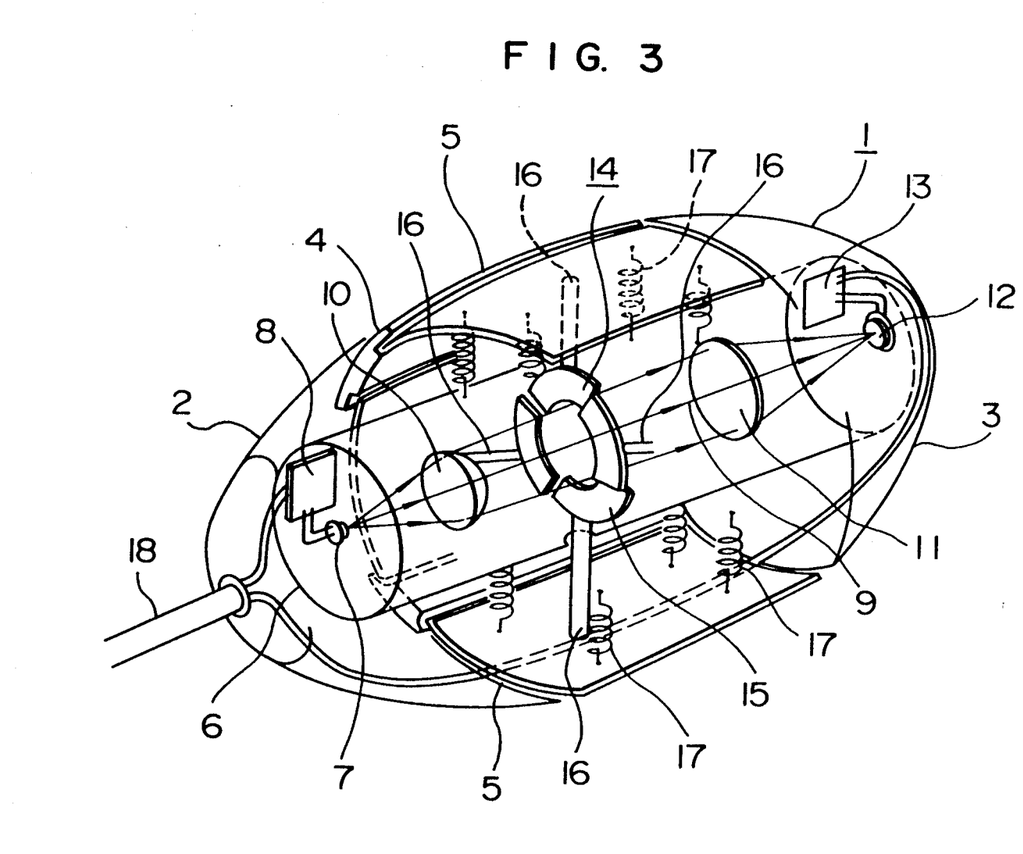
FIG. 3 is a perspective view, partially broken away, of the apparatus shown in FIG. 2.
Figure 4:
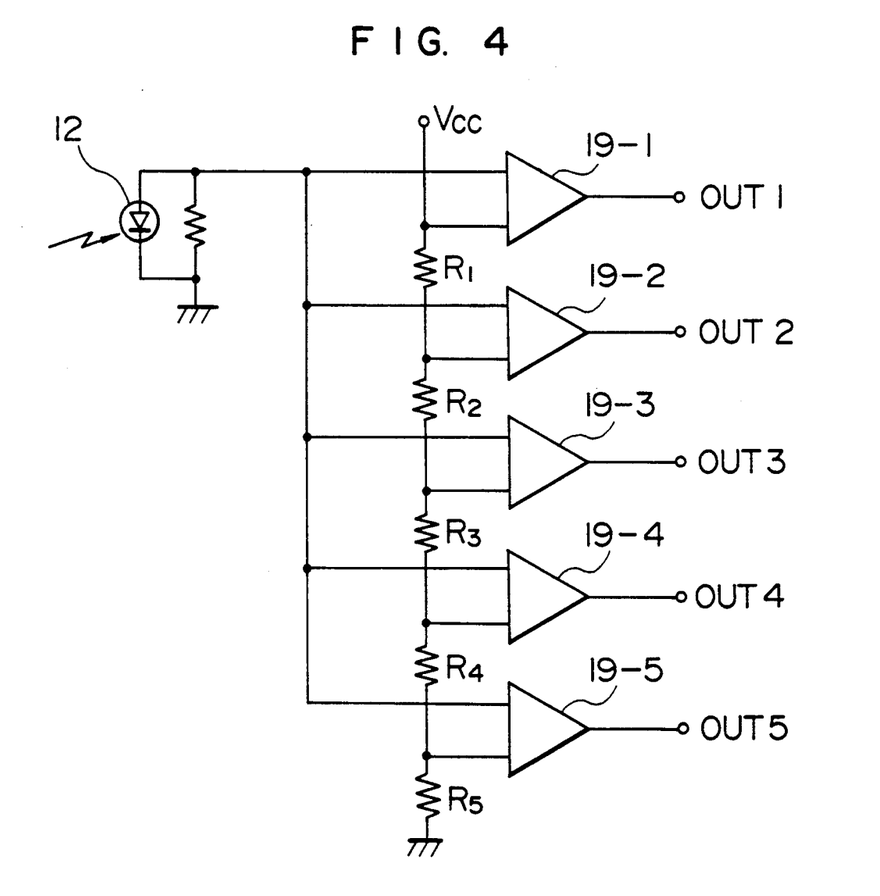
FIG. 4 is a diagram showing the detection circuit incorporated in the light receiving circuit section of the apparatus.

FIGS. 2 through 4 show a landslide detecting apparatus in accordance with an embodiment of this invention. FIG. 2 is an outside view of the apparatus; FIG. 3 is a partially cutaway view in perspective of the same; and FIG. 4 is a diagram showing the detection circuit incorporated in the light receiving circuit section of the apparatus.

As shown in FIGS. 2 and 3, an outer shell 1 includes substantially semispherical end walls 2 and 3 gradually tapering toward the external ends. The open ends of these end walls 2 and 3 are connected to each other through the intermediation of a plurality of beams 4 arranged circumferentially at substantially equal intervals, with a plurality of (four in the example shown) movable members 5 being provided between these beams 4. The movable members 5 are capable of moving towards or away from the central axis of the apparatus, and are prevented from coming off by the beams 4. Provided inside the outer shell 1 is a cylindrical casing 6, which is fixed, for example, to the end walls 2 and 3. Provided and protected inside the casing 6 are: a light emitting diode (hereinafter referred to as "LED") 7 serving as the light source; a light emitting circuit section 8 for driving this LED 7; a collimator lens 10 for converting a beam of light from the LED 7 into a parallel pencil of rays 9; a condenser lens 11 for condensing the parallel pencil of rays 9; a light receiving element 12 arranged at the focal position of the condenser lens 11; and a light receiving circuit section 13 for evaluating the conditions of the earth's crust on the basis of the output from the light receiving element 12. The LED 7, the collimator lens 10, the condenser lens 11, and the light receiving element 12 are supported by the casing 6 in such a manner that they share a common optical axis. A circular diaphragm 14 is provided in the intermediate position between the collimator lens 10 and the condenser lens 11. This diaphragm 14 is composed of a plurality of fan-shaped diaphragm pieces 15, which are combined together in a circle. These fan-shaped diaphragm pieces 15 are arranged in correspondence with the movable members 5, which constitute the outer shell 1, with their number being the same. Each diaphragm piece 15 is operationally connected to the corresponding movable member 5 by a column 16, which is a linkage member slidably extending through the wall of the casing 6. Each movable member 5 is supported in its four corners by compression springs 17 provided between it and the casing 6, whereby the diaphragm pieces 15 are arranged in a circle. Accordingly, when a movable member 5 is depressed and displaced inwards against the resilience of the compression springs 17, the corresponding diaphragm piece 15 is caused, through the column 16, to move toward the central axis. When the movable member 5 is released from the depressing force, the movable member 5 and the associated diaphragm piece 15 can be restored to their original outer positions by virtue of the resiliency of the compression springs 17. The reference numeral 18 indicates a cable for the power supply to the light emitting circuit section 8 and for the extraction of signals from the light receiving circuit section 13.

As shown in FIG. 4, incorporated in the light receiving circuit section 13 is a detection circuit adapted to compare the quantity of light detected by the light receiving element 12 with the constants of a plurality of (five in the example shown) comparators. That is, the quantity of light detected by the light receiving element 12 is compared with the constants R1 through R5 of comparators 19-1 through 19-5 before it is output. The constants R1 through R5 are so set as to correspond to the distance of movement of the movable members 5, that is, the magnitude of change in the earth's crust.

In the following, the operation of the system constructed as described above, will be explained.

After laying this detection apparatus under the ground, the LED 7 is driven by the light emitting circuit section 8. The beam of light emitted from the LED 7 is converted into a parallel pencil of rays 9 by the collimator lens 10. The parallel pencil of rays 9 are condensed upon the light receiving element 12 by the condenser lens 11. The light receiving circuit 13 makes a judgment of the conditions of the earth's crust on the basis of the quantity of light detected by the light receiving element 12. When, as a result of any change in the earth's crust, a force (or forces) is (are) applied to this apparatus in a certain direction or in a plurality of directions, the movable member(s) 5 in that (those) direction(s) is (are) depressed in the direction(s) indicated by the arrows of FIG. 2. When a movable member 5 is thus depressed, the associated diaphragm member 15 is pushed inwards against the resiliency of the compression springs 17, thereby partially intercepting the parallel pencil of rays 9. The quantity of light intercepted is proportional to the magnitude of change in the earth's crust. The change in the earth's crust may be in one or a plurality of directions. In any case, the quantity of light intercepted is determined by the integration of the forces depressing the compression springs 17. This beam of light 9 undergoing a change is condensed by the condenser lens 11, and, on the basis of the quantity of light detected by the light receiving element 12, the condition of the earth's crust is evaluated by the light receiving circuit section 13.

Figure 5:
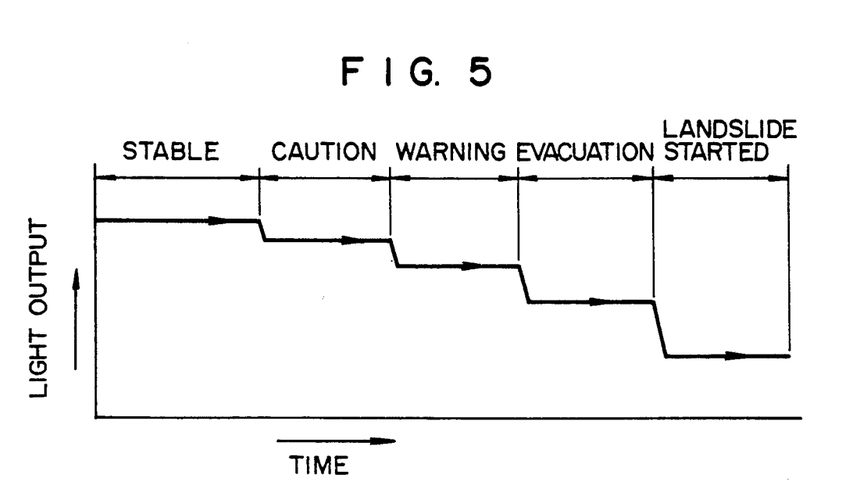
FIG. 5 is a chart illustrating the relationship between the conditions of the earth's crust and the light detection level in the detecting apparatus of the above embodiment.

FIG. 5 shows an example of a set of relative values indicative of the relationship between the conditions of the earth's crust and the quantity of light detected in the present detecting apparatus. When the quantity of the light beam 9 received by the light receiving device 12 remains at the maximum level, the earth's crust surrounding the detection apparatus is considered to be in the "stable" condition. A slight change in the conditions of the earth's crust will cause a movable member 5 to be depressed, causing the associated diaphragm piece 15 to slightly intercept the light beam 9, resulting in a slight decrease in the relative light output. This condition is referred to as "caution". When the change in the earth's crust is still greater and the relative light output smaller, the condition is referred to as "warning". More dangerous conditions of the earth's crust are referred to as "evacuation" and "landslide started". The judgment of these conditions is controlled by the detection circuit shown in FIG. 4, which is adapted to output the detection results. Constants R1 through R5 corresponding to the above conditions of "stable", "caution", "warning", "evacuation", and "landslide started", are respectively allotted to the comparators 19-1 through 19-5. The evaluation of the conditions of the earth's crust is made by comparing the input (the quantity of light) of the light receiving element 12 with the constants R1 through R5 by means of the comparators 19-1 through 19-5, i.e., in accordance with which of their outputs, OUT 1 through OUT 5, is ON. In this example, OUT 1 through OUT 5 of the comparators 19-1 through 19-5 respectively correspond to the conditions: "stable", "caution", "warning", "evacuation", and "landslide started".

Thus, in accordance with the embodiment described above, any change in the conditions of the earth's crust causes the movable member 5 positioned in the direction of the change to be depressed and displaced through a distance corresponding to the magnitude of the change, with the corresponding diaphragm member 15 intercepting the light beam 9. This results in a change in the quantity of light detected, and, by detecting this change, the conditions of the earth's crust can be judged to be as one of the classified states: "stable", "caution", "warning", "evacuation", and "landslide started". Further, in accordance with the above embodiment, any change in the earth's crust can be detected in a plurality of levels from "stable" to "landslide started", so that it is possible to inform drivers, inhabitants, etc. in that area of the conditions of "caution", "warning", etc. while continuing the observation.

As described above, in accordance with the first invention, a beam of light from a light source of a detecting apparatus laid under the ground are converted into a parallel pencil of rays by a collimator lens and is condensed upon a light receiving element by a condenser lens. When there occurs any change in the earth's crust in a direction where a landslide can be caused, the movable member placed in that direction is depressed, with the associated diaphragm piece being pushed inwards against the resiliency of the compression springs through a distance in proportion to the magnitude of the change. As a result, the parallel pencil of rays is partially intercepted, causing a change in the level of light detected by the light receiving element. By observing this change, the change in the earth's crust can be detected along with its magnitude. By thus installing it under the ground, the system can be protected from the influence of the surrounding weather conditions. Accordingly, it is possible to detect both subtle and large changes in the earth's crust. Furthermore, this structure helps to attain a reduction in size, weight, and cost.

In the following an embodiment of the second invention will be described with reference to the accompanying drawings.

Figure 6:
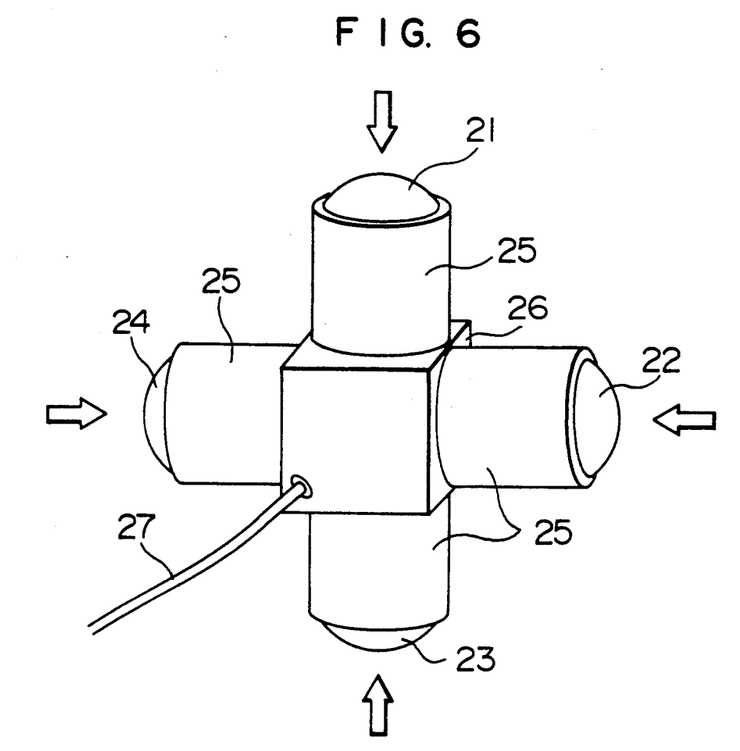
FIG. 6 is a perspective view showing the construction of a landslide detecting apparatus in accordance with an embodiment of a second invention.

FIG. 6 is a perspective view showing the construction of a landslide detecting apparatus in accordance with an embodiment of this invention.

The apparatus shown includes four detection units respectively equipped with semispherical movable portions 21 through 24 and cylindrical casings 25. The apparatus further includes a cubic casing 26 and a signal cable 27.

Figure 7:
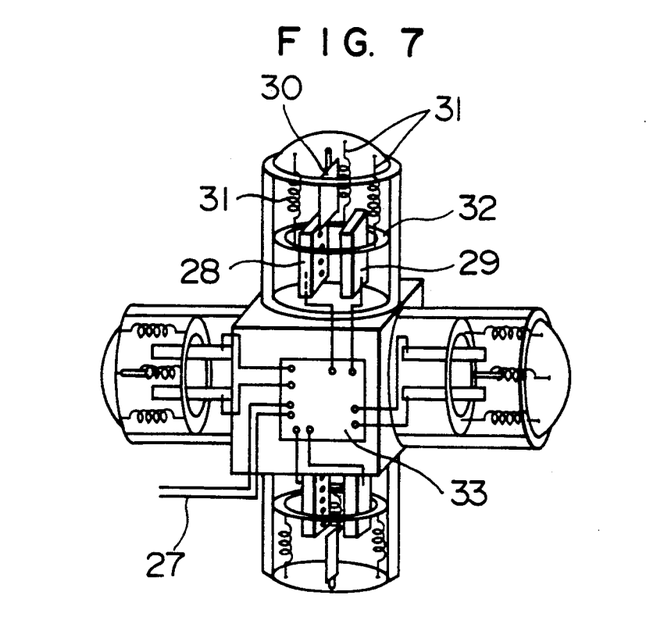
FIG. 7 is an opened-up view showing the inner structure of a landslide detecting apparatus in accordance with an embodiment of the present invention.

FIG. 7 is an opened-up view showing the inner structure of a landslide detecting apparatus in accordance with an embodiment of this invention. The apparatus shown includes: light-emitting-element groups 28 each consisting of a row of light emitting elements; light-receiving-element groups 29 arranged opposite thereto; shading plates 30 positioned in the upper sections of the space between the light-emitting-element groups 28 and light-receiving-element groups 29; springs 31 attached to the inner surfaces of the movable portions 21 through 24 and to frames 32 inside the casings 25; and a circuit section 33 for performing signal processing and driving the light-emitting-element groups and light-receiving-element groups lodged in the movable portions 21 through 24.

Figure 8:
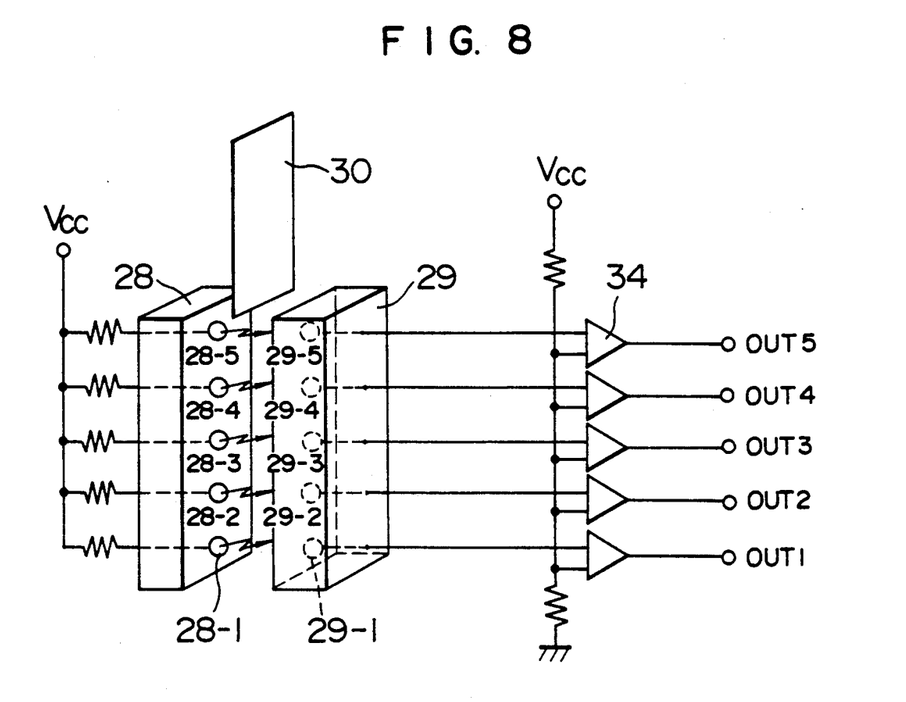
FIG. 8 is a schematic diagram showing the construction of the essential part of a landslide detecting apparatus in accordance with an embodiment of the present invention.

FIG. 8 is a schematic view showing the construction of the light-emitting-element group and light-receiving element group. The reference numeral 34 indicates comparators.

Figure 9:
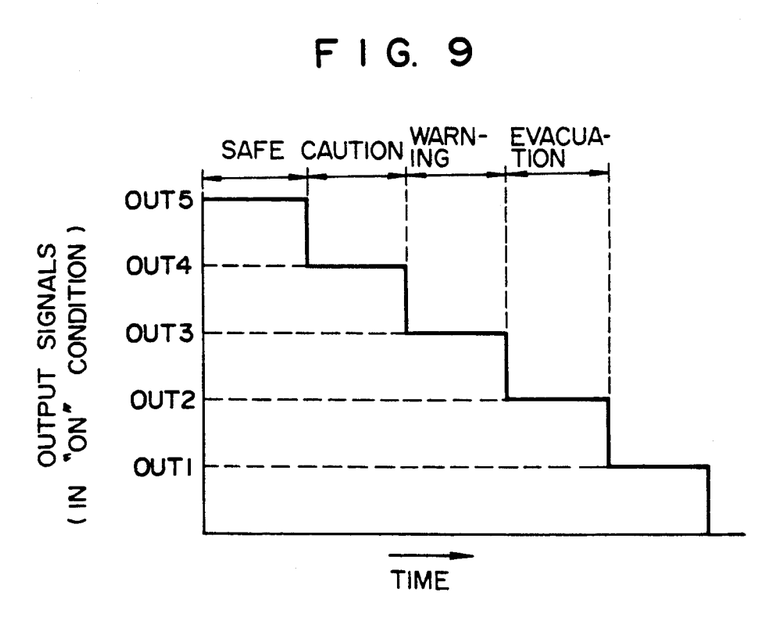
FIG. 9 is a characteristic chart showing the detection outputs of a landslide detecting apparatus in accordance with an embodiment of the present invention.

FIG. 9 is a graph showing the relationship between the signal output of a landslide detecting apparatus in accordance with an embodiment of this invention laid under the ground and the condition of the earth's crust around it.

The operation of this landslide detecting apparatus, constructed as described above, will now be explained. When a change occurs in the earth's crust with this landslide detecting apparatus laid under the ground, a force is applied to the apparatus in the direction of the change, partially or entirely depressing the semispherical movable portions 21 through 24 inwards against the resilient force of the springs 31. As a result, the shading plates 31 are gradually moved inwards between the light-emitting-element groups 28 and light-receiving-element groups 29, in proportion to the magnitude of the force of the change in the earth's crust thereby shading the light emitted from the light-emitting-element. The graph of FIG. 9 shows the relationship between the magnitude of the earth's crust change and the output of the light-receiving-element groups.

If, as in the case of FIG. 6, four detection units each equipped with a semispherical movable portion are arranged radially, it is possible to know from which of the unit the signals shown in FIG. 9 have been emitted, thus making it possible to know the direction of earth crust change as well as its magnitude.

The detection results may, for example, be evaluated as follows: Assuming that each detection unit is equipped with five light receiving elements and the outputs of them all, OUT 1 through OUT 5 shown in FIG. 8, are ON, the earth's crust may be considered to be in the "safe" condition. If OUT 1 through OUT 4 are ON, it may be considered to be in the "caution" condition, and, if OUT 1 through OUT 3, or OUT 1 and OUT 2, are ON, in the "warning" or the "evacuation" condition.

Thus, with the landslide detecting apparatus of the above embodiment of this invention, the movable portions 21 through 24 thereof are depressed inwards in the direction of that change and by a force corresponding to the magnitude of the change, with the associated shading plates intervening between the light-emitting-element groups 28 and light-receiving-element groups 29. The condition of the earth's crust can be evaluated as: "safe", "caution", "warning", or "evacuation". Thus, it is possible to inform the drivers or inhabitants in the area of the conditions of "caution", "warning", etc. while continuing the observation.

As described above, the landslide detecting apparatus of this embodiment comprises a plurality of detection units arranged three-dimensionally and radially, each of the detecting units being lodged in a closed casing and equipped with a movable portion adapted to be displaced with respect to the casing by external pressures, the casing further containing a shading plate fixed to the movable portion and a row of light emitting elements and a row of light receiving elements fixed to the casing and opposed to each other, the shading plate being adapted to move between the rows of light emitting and light receiving elements upon relative displacement of the movable portion in proportion to the external pressure applied thereto to intercept the light from that number of light emitting elements which corresponds to the displacing amount of the movable portion. Thus, this landslide detecting apparatus can be made in a simple structure without using any distortion detector, etc.

While in the above embodiment the signal processing circuit of the light receiving element is arranged inside the apparatus, it is possible for this circuit to be provided separately on the ground. Further, the sealing between the movable portion and the casing of the detection unit can be realized by covering the essential portion with a thin rubber cap.

As is apparent from the above embodiment, the landslide detecting apparatus of this invention comprises a plurality of detection units each equipped with a movable portion adapted to be displaced by external pressures. The detection units are arranged three-dimensionally such that their movable portions are adapted to be displaced in different radial directions. Provided in the casing of each detection unit are a shading plate fixed to the movable portion and rows of light emitting and light receiving elements arranged opposite to each other and fixed to the casing, the shading plate being adapted to be displaced between the row of light emitting and light receiving elements through a distance proportional to the external pressure applied thereto to intercept the light from that number of light receiving elements which corresponds to the displacement of the movable portion. Thus, this invention makes it possible to obtain a landslide detecting apparatus having a simple structure.

What is claimed is:

1. A landslide detecting apparatus comprising: a light source; a collimator lens for converting a beam of light from said light source into a parallel pencil of rays; a condenser lens for condensing said parallel pencil of rays; a light receiving element arranged at the focal position of said condenser lens; a support means for supporting said light source, said collimator lens, said condenser lens, and said light receiving element such that said light source, said collimator lens, said condenser lens, and said light receiving element have a common optical axis; a circular diaphragm arranged in an intermediate position between said collimator lens and said condenser lens and including a plurality of diaphragm pieces; movable members equal in number to said plurality of diaphragm pieces and constituting a part of an outer shell of said landslide detecting apparatus; connecting members for interlocking said movable members and said diaphragm pieces; and springs biassing said movable members toward a rest outer position, said diaphragm pieces being arranged in a circle when said movable members occupy said rest outer position.

2. A landslide detecting apparatus comprising: a plurality of detection units arranged three-dimensionally and radially, each of said detection units being lodged in a closed casing and provided with a movable portion capable of moving with respect to said casing in response to external pressures, said casing further containing a shading plate fixed to said movable portion and a row of light emitting elements and a row of light receiving elements fixed to said casing and opposed to each other, said shading plate being movable between said row of light emitting elements and said row of light receiving elements in accordance with relative displacement of said movable portion.

* * * * *